(12) United States Patent
Yang et al.

(10) Patent No.: US 12,216,350 B2
(45) Date of Patent: Feb. 4, 2025

(54) ANTI-GLARE AND ANTI-REFLECTION FILM, POLARIZER AND DISPLAY PANEL

(71) Applicant: TCL CHINA STAR OPTOELECTRONICS TECHNOLOGY CO., LTD., Shenzhen (CN)

(72) Inventors: Weiheng Yang, Shenzhen (CN); Hong Yang, Shenzhen (CN); Zhichao Liao, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/770,649

(22) PCT Filed: Mar. 2, 2022

(86) PCT No.: PCT/CN2022/078764
§ 371 (c)(1),
(2) Date: Aug. 31, 2023

(87) PCT Pub. No.: WO2023/159660
PCT Pub. Date: Aug. 31, 2023

(65) Prior Publication Data
US 2024/0160060 A1 May 16, 2024

(30) Foreign Application Priority Data
Feb. 24, 2022 (CN) .......................... 202210173753.7

(51) Int. Cl.
*G02F 1/1335* (2006.01)

(52) U.S. Cl.
CPC .. *G02F 1/133502* (2013.01); *G02F 1/133504* (2013.01); *G02F 1/133528* (2013.01); *G02F 1/133553* (2013.01)

(58) Field of Classification Search
None
See application file for complete search history.

(56) References Cited

U.S. PATENT DOCUMENTS

| 3,025,764 A | * | 3/1962 | Mckenzie | G03B 21/602 |
|---|---|---|---|---|
| | | | | 65/60.8 |
| 2010/0068504 A1 | | 3/2010 | Lin et al. | |

FOREIGN PATENT DOCUMENTS

| CN | 102375165 A | 3/2012 |
|---|---|---|
| CN | 106094387 A | 11/2016 |

(Continued)

OTHER PUBLICATIONS

International Search Report in International application No. PCT/CN2022/078764, mailed on Nov. 23, 2022.

(Continued)

*Primary Examiner* — Dung T Nguyen
(74) *Attorney, Agent, or Firm* — Dickinson Wright PLLC

(57) ABSTRACT

The present application provides an anti-glare and anti-reflection film, a polarizer and a display panel. The anti-glare and anti-reflection film includes: a hardened layer; and first extinction particles dispersed in the hardened layer. The first extinction particles include a particle core, a first coating covering the particle core, and a second coating covering the first coating, and the first coating has a greater refractive index than that of the second coating. The anti-glare and anti-reflection film, polarizer and display panel provided by the present application can improve haze of a product itself and reduce reflectivity of a product itself, so as to improve quality of display screen.

18 Claims, 2 Drawing Sheets

(56) References Cited

FOREIGN PATENT DOCUMENTS

| CN | 111100314 A | 5/2020 |
| CN | 111580191 A | 8/2020 |
| CN | 212391631 U | 1/2021 |
| JP | 2006003453 A | 1/2006 |

OTHER PUBLICATIONS

Written Opinion of the International Search Authority in International application No. PCT/CN2022/078764, mailed on Nov. 23, 2022.
Chinese Decision of Rejection issued in corresponding Chinese Patent Application No. 202210173753.7 dated Mar. 1, 2023, pp. 1-6.

\* cited by examiner

FIG. 2

ANTI-GLARE AND ANTI-REFLECTION FILM, POLARIZER AND DISPLAY PANEL

CROSS-REFERENCE TO RELATED APPLICATIONS

This application is a U.S. National Stage of International Application No. PCT/CN2022/078764, filed on Mar. 2, 2022, which claims the benefit and priority of Chinese Patent Application No. 202210173753.7, filed on Feb. 24, 2022, the entire contents of which are incorporated herein by reference.

TECHNICAL FIELD

The present application relates to a technical field of anti-glare, and in particular, to an anti-glare and anti-reflection film, a polarizer and a display panel.

BACKGROUND

With the rapid development of liquid crystal display technology, liquid crystal display screen has become a mainstream product in display field from an initial application in small-sized mobile phone screens to a wide application in large-sized computers and TV screens. As a result, there are higher requirements for image quality and environmental adaptability of a display.

As far as traditional LCD screens are concerned, "glare" generally exists in the application process. This is due to the fact that a display without anti-glare treatment will have specular reflection under conditions of strong external ambient light, thus causing human eyes to feel strong reflected light, and resulting in a "glare" response. In fact, reflection of external ambient light will not only cause a "glare" problem, but also lead to a lack of blackness in a display, resulting in a decrease in contrast performance that seriously affects the display effect. In addition, the reflected light is mixed with red, green and blue monochromatic lights originally emitted by a display, resulting in color deviation, which directly affects quality of display screen. In order to solve this series of problems, anti-glare film emerges as the times require. However, existing anti-glare film still has some defects in improving quality of display screen.

Technical Problem

Existing anti-glare film still has some defects in improving quality of display screen.

Technical Solution

In this regard, the present application provides an anti-glare and anti-reflection film, which can improve haze of a product itself and reduce reflectivity of a product itself, so as to improve quality of display screen.

The present application further provides a polarizer comprising the anti-glare and anti-reflection film.

The present application further provides a display panel comprising the polarizer.

In order to solve the above problems, the present application provides technical solutions as follows:

According to a first aspect, the present application provides an anti-glare and anti-reflection film, which comprises:
a hardened layer; and
first extinction particles dispersed in the hardened layer; wherein the first extinction particles comprise a particle core, a first coating covering the particle core, and a second coating covering the first coating, and the first coating has a refractive index different from that of the second coating.

In an alternative embodiment of the present application, at least a part of the first extinction particles is exposed from a surface of the hardened layer to change the surface of the hardened layer into a roughened surface.

In an alternative embodiment of the present application, the first extinction particles exposed from the hardened layer are uniformly distributed and uniform in size.

In an alternative embodiment of the present application, a height of a portion of the first extinction particles exposed from the hardened layer protruding from a surface of the hardened layer is defined as H, and H is within a following range: $\frac{2}{3}R \leq H < 2R$, wherein R is a radius of the first extinction particles.

In an alternative embodiment of the present application, another part of the first extinction particles is accumulated in the hardened layer.

In an alternative embodiment of the present application, a diameter of the particle core is defined as d1, a thickness of the first coating is defined as d2, and a thickness of the second coating is defined as d3; wherein $2\ \mu m \leq d1 \leq 3\ \mu m$, $0.5\ \mu m \leq d2 \leq 1.5\ \mu m$, and $100\ nm \leq d3 \leq 200\ nm$.

In an alternative embodiment of the present application, a refractive index of the first coating is ranging from 1.3 to 1.4, and a refractive index of the second coating is ranging from 1.6 to 1.7.

In an alternative embodiment of the present application, a material of the hardened layer is a composite resin, and the composite resin comprises at least two different kinds of resins.

In an alternative embodiment of the present application, the anti-glare and anti-reflection film further comprises second extinction particles, and the second extinction particles are dispersed in the hardened layer.

In an alternative embodiment of the present application, both the particle core and the second extinction particles are selected from at least one of fumed $SiO_2$, precipitated $SiO_2$, modified $SiO_2$, and metal oxide particles.

In an alternative embodiment of the present application, a mass percentage of the first extinction particles is greater than 80% of a total mass of the first extinction particles and the second extinction particles.

In an alternative embodiment of the present application, a size of the second extinction particles is smaller than a size of the first extinction particles.

According to a second aspect, the present application further provides a polarizer, which comprises:
a polarizer; and
anti-glare and anti-reflection film as described above; wherein the anti-glare and anti-reflection film is formed on the polarized body.

In an alternative embodiment of the present application, at least a part of the first extinction particles are exposed from a surface of the hardened layer away from the polarized body.

According to a third aspect, the present application further provides a display panel, which comprises:
a display substrate; and
a polarizer as described above; wherein the polarizer is formed on the display substrate.

TECHNICAL EFFECTS

The present application provides an anti-glare and anti-reflection film, a polarizer and a display panel, the polarizer comprises an anti-glare and anti-reflection film formed on the polarized body, and the anti-glare and anti-reflection film comprises a hardened layer; and first extinction particles dispersed in the hardened layer. The first extinction particles comprise a particle core, a first coating covering the particle core, and a second coating covering the first coating, and the first coating has a refractive index different from that of the second coating. According to interference principle of reflected light, destructive interference may be occurred among lights incident on coatings with different refractive indexes of the first extinction particle, which can reduce reflectivity of the anti-glare and anti-reflection film, thereby improving anti-reflection effect of the anti-glare and anti-reflection film, and improving quality of display screen of the display panel. In addition, at least a part of the first extinction particles are exposed from a surface of the hardened layer away from the polarized body to change the surface of the hardened layer away from the polarized body into a roughened surface, so as to improve haze of the anti-glare and anti-reflection film, light may be scattered on the rough surface of the anti-glare and anti-reflection film, and light entering the anti-glare and anti-reflection film may be internally scattered and refracted, so that the anti-glare effect of the anti-glare and anti-reflection film may be improved, thereby improving quality of display screen of the display panel.

BRIEF DESCRIPTION OF THE DRAWINGS

In order to more clearly describe the technical solutions in the embodiments of the present application, hereinafter, the appended drawings used for describing the embodiments will be briefly introduced. Apparently, the appended drawings described below are only directed to some embodiments of the present application, and for a person skilled in the art, without expenditure of creative labor, other drawings can be derived on the basis of these appended drawings.

FIG. 1 is a block diagram of a display device according to a preferred embodiment of the present application.

FIG. 2 is a sectional view of a display panel according to a preferred embodiment of the present application.

DETAILED DESCRIPTION

Figure 3:
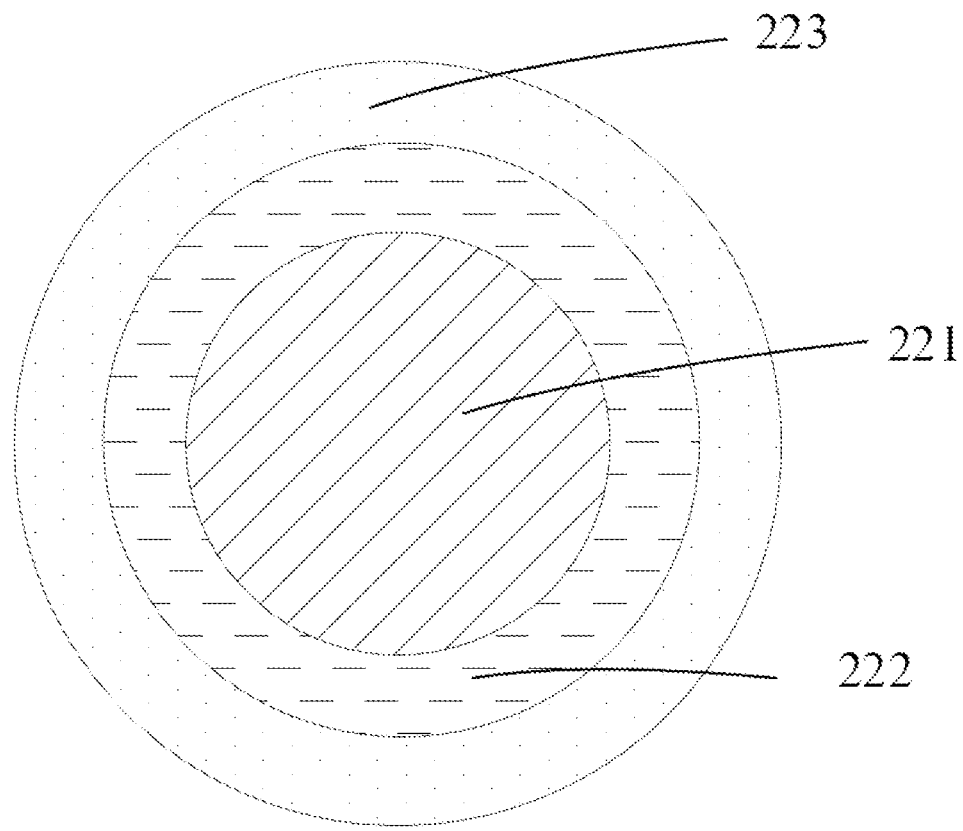
FIG. 3 is a sectional view of first extinction particles according to a preferred embodiment of the present application.

Hereinafter, technical solution in embodiments of the present application will be clearly and completely described with reference to the accompanying drawings in embodiments of the present application. Apparently, the described embodiments are part of, but not all of, the embodiments of the present application. All the other embodiments, obtained by a person with ordinary skill in the art on the basis of the embodiments in the present application without expenditure of creative labor, belong to the protection scope of the present application.

In description of the present application, it should be understood that the terms "upper" and "lower", etc., that indicating an orientation or a positional relationship are based on an orientation or a positional relationship shown in the accompanying drawings, which are merely intended to facilitate the description of the present application and simplify the description, and are not intended to indicate or imply that a device or an element must have a specific orientation, be constructed and operated in a specific orientation, and therefore cannot be construed as a limitation of the present application. In addition, the terms "first" and "second" are used for descriptive purposes only and cannot be understood as indicating or implying relative importance or implying a number of the indicated technical features. Thus, the features defined by "first" and "second" may explicitly or implicitly include one or more of the features. In the description of the present application, "multiple" means the meaning of two or more than two, unless otherwise specifically defined.

In the present application, reference numbers and/or reference letters may be used repeatedly in different embodiments, such repetition is for sake of simplicity and clarity, which in itself does not indicate the relationship between the various embodiments and/or arrangements discussed.

The array substrate, liquid crystal display panel and display device provided by the present application will be described in detail below with reference to specific embodiments and drawings.

Figures 1, 2:
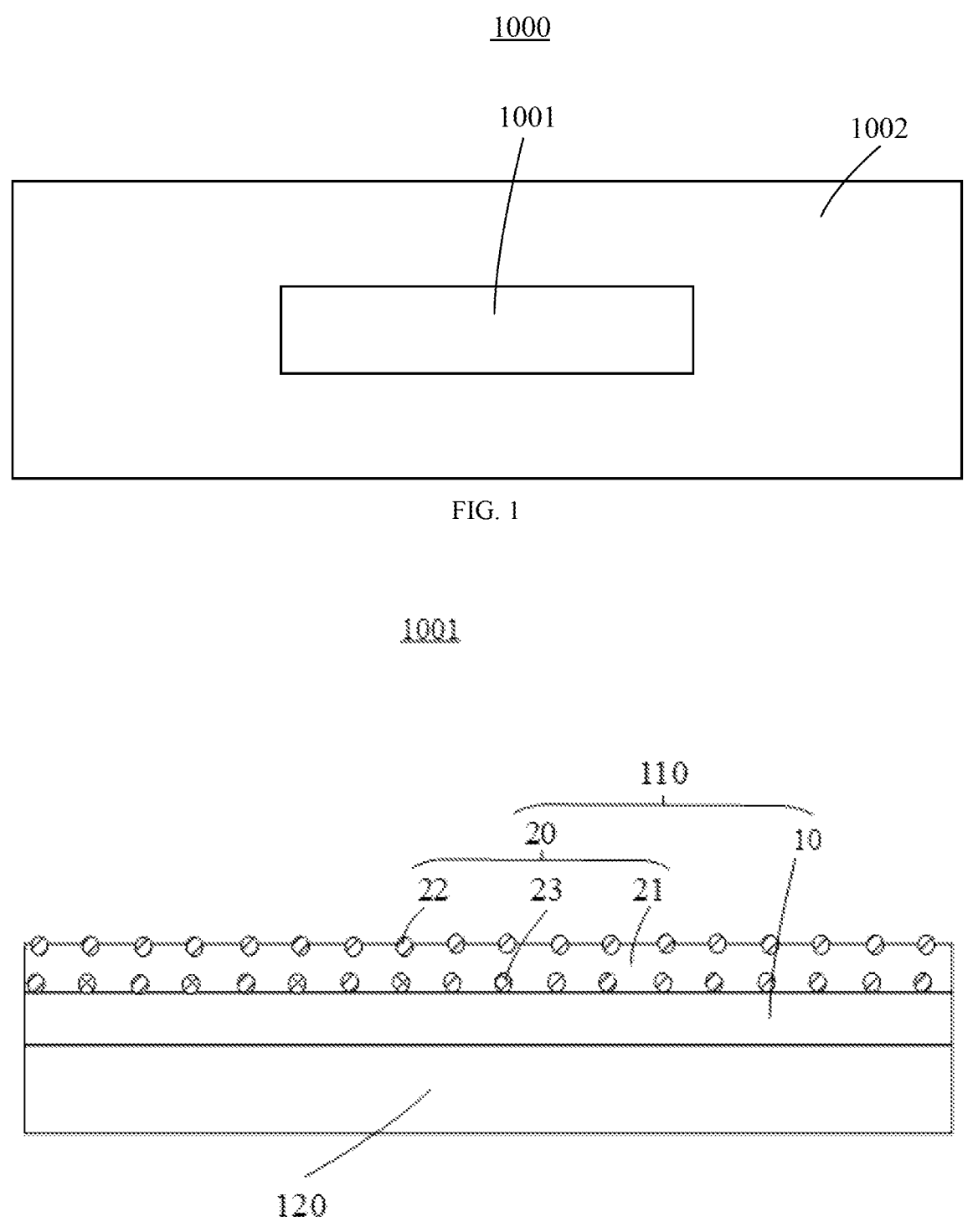

Referring to FIG. 1, the present application provides a display device 1000. The display device 1000 comprises a display panel 1001 and a body 1002, wherein the display panel 1001 is disposed in the body 1002.

In this embodiment, the display device 1000 may be a display screen, a notebook, and a computer, etc. The display panel 1001 may be a display panel such as a liquid crystal display panel, an OLED display panel, an Micro-LED display panel, and an Mini-LED, etc.

Referring to FIG. 2, the display panel 1001 comprises a polarizer 110 and a display substrate 120. The polarizer 110 comprises a polarized body 10 and an anti-glare and anti-reflection film 20 formed on the polarized body 10. The polarized body 10 is formed on a surface of the display substrate 120 between the anti-glare and anti-reflection film 20 and the display substrate 120.

In this embodiment, the display substrate 120 may be at least one of a liquid crystal display substrate, an OLED display substrate, an Micro-LED display substrate, and an Mini-LED substrate, etc.

In this embodiment, the polarized body 10 comprises a compensation film (not shown) formed on the display substrate 120, a polarized layer (not shown) formed on the compensation film, and a protective layer (not shown) formed on the polarized layer. The anti-glare and anti-reflection film 20 is formed on the protective layer, and the protective layer is a substrate of the anti-glare and anti-reflection film 20. Wherein, a material of the compensation film may be a cyclo olefin polymer (COP), and a tri-cellulose acetate (TCA), etc, for example, the material of the compensation film may a COP material with a trade name of SANUQI, and TCA materials with trade names of and PK3 and NR01, respectively. A material of the polarized layer may be a material with polarizing effect such as polyvinyl alcohol vinylalcohol polymer (PVA). A material of the protective layer may be a material such as TCA, polymethyl methacrylate (PMMA), and polyethylene terephthalate (PET), etc.

In other embodiments, structure of the polarized body 10 is not limited to the above structures, and may be adjusted according to an actual condition.

Referring to FIGS. 2 and 3 again, the anti-glare and anti-reflection film 20 comprises a hardened layer 21 and first extinction particles 22 dispersed in the hardened layer 21. The first extinction particles 22 comprise a particle core 221, a first coating 222 covering the particle core 221, and a second coating 223 covering the first coating 222. The first coating layer 222 has a refractive index different from that of the second coating layer 223.

Specifically, a refractive index of the first coating 222 is ranging from 1.3 to 1.4, and a material of the first coating layer 222 is a fluorine-containing ultraviolet curing resin (doped with air gap bubbles) and other low-refractive-index materials. A refractive index of the second coating 223 is ranging from 1.6 to 1.7, and a material of the second coating 223 is ultraviolet curable resin and other high-refractive-index materials.

The first extinction particles 22 may be directly pressed into the hardened layer 21 by an embossing process, etc., or the first extinction particles 22 may be mixed into a material for preparing the hardened layer 21, and then the hardened layer 21 may be formed by coating.

Figure 4:
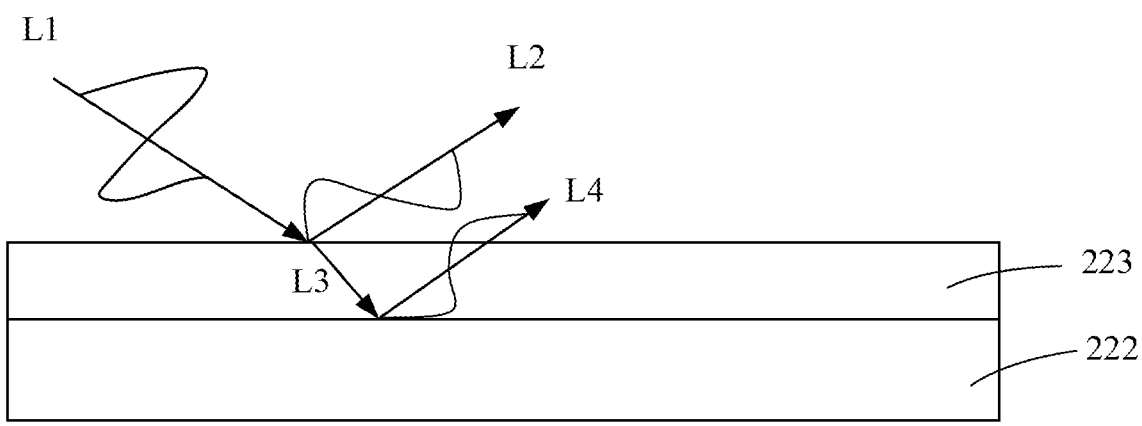
FIG. 4 is a schematic diagram of destructive interference among lights on coatings with different refractive indices.

Referring to FIG. 4, when the light L1 enters the second coating 223 from outside, a part of the light is reflected on a surface of the second coating 223 and generates a first reflected light L2, and another part of the light is refracted inside the second coating 223 and generates a refracted light L3. The refracted light L3 is incident on a contact surface between the first coating 222 and the second coating 223 and is reflected on the contact surface to generate a second reflected light L4. According to interference principle of reflected light, destructive interference may be occurred among lights incident on coatings with different refractive indexes of the first extinction particles. Since the refractive indexes of the first coating 222 and the second coating 223 of the first extinction particles 22 provided by the present application are different, destructive interference may be occurred between the first reflected light L2 and the second reflected light L4, so that reflected light of the light L1 on the surface of the first extinction particles 22 can be reduced, so as to reduce reflectivity of the first extinction particles 22, thereby improving anti-reflection effect of the anti-glare and anti-reflection film 20, so as to improve quality of display screen of the display panel 1001.

Theoretically, formula for calculating reflectivity of the anti-glare and anti-reflection film 20 is as follows:

$$R = \frac{n_1^2(n_0 - n_2)^2 - (n_0^2 - n_1^2)(n_1^2 - n_2^2)\sin^2(2\pi n_1 d/\lambda)}{n_1^2(n_0 + n_2)^2(n_0^2 - n_1^2)(n_1^2 - n_2^2)\sin^2(2\pi n_1 d/\lambda)}$$

Wherein, R is reflectivity, $n_0$ is refractive index of a medium in which the incident light is located (the refractive index of air is 1), $n_1$ is refractive index of a first layer (the second coating 223), $n_2$ is refractive index of a second layer (the first coating 222), d is thickness of the second layer 223, and k is wavelength of the incident light. Theoretically, reflectivity is the lowest when the thickness meets a formula of $n_1 d = k\lambda/4$. The formula is as follows:

$$R = \left(\frac{n_2 - n_1^2}{n_2 + n_1^2}\right)^2$$

Therefore, d can be calculated based on the formula of $n_1 d = k\lambda/4$.

In an alternative embodiment of the present application, at least a part of the first extinction particles 22 are exposed from a surface of the hardened layer 21 away from the polarized body 10 to change the surface of the hardened layer 21 away from the polarized body 10 into a roughened surface, so as to improve haze of the anti-glare and anti-reflection film 29, a part of the light may be scattered on the rough surface of the anti-glare and anti-reflection film 20, and light entering the anti-glare and anti-reflection film 20 may be internally scattered and refracted, so that the anti-glare effect of the anti-glare and anti-reflection film 20 may be improved, thereby improving quality of display screen of the display panel 1001.

In another alternative embodiment of the present application, another part of the first extinction particles 22 accumulates inside the hardened layer 21 and faces the polarized body 10.

In an alternative embodiment of the present application, the first extinction particles 22 are distributed in rows in the hardened layer 21. Specifically, in this embodiment, the first extinction particles 22 are distributed in two rows in the hardened layer 21, wherein one row of the first extinction particles 22 is exposed from the hardened layer 21, and the other row of the first extinction particles 22 is dispersed inside the hardened layer 21.

In an alternative embodiment of the present application, the first extinction particles 22 exposed from the hardened layer 21 are uniformly distributed and uniform in size, so that the anti-glare and anti-reflection effect of the whole anti-glare and anti-reflection film 20 is uniform, phenomenon of strong local reflection light and glare can be avoided, and quality of display screen of the display panel 1001 can be further improved.

In an alternative embodiment of the present application, the first extinction particles 22 exposed from the hardened layer 21 are spherical.

In an alternative embodiment of the present application, a height of a portion of the first extinction particles 22 exposed from the hardened layer 21 protruding from a surface of the hardened layer 21 away from the polarized body 10 is defined as H, and H is within a following range: $\frac{2}{3}R \leq H < 2R$, wherein R is a radius of the first extinction particles 22. The anti-glare and anti-reflection film can have a better haze by providing H within the range of $\frac{2}{3}R \leq H < 2R$.

In an alternative embodiment of the present application, the first extinction particles 22 have a diameter in a micron scale. Specifically, a diameter of the particle core is defined as d1, a thickness of the first coating is defined as d2, and a thickness of the second coating is defined as d3; wherein 2 μm≤d1≤3 μm, 0.5 μm≤d2≤1.5 μm, and 100 nm≤d3≤200 nm.

According to existing research theory, a particle has a better scattering intensity when the particle size is less than 4 μm, therefore, when the first extinction particles 22 have size as above (2 μm≤d1≤3 μm, 0.5 μm≤d2≤1.5 μm, and 100 nm≤d3≤200 nm), the first extinction particles 22 have a better scattering intensity, so that the anti-glare and anti-reflection effect of the anti-glare and anti-reflection film 20 can be improved, thereby improving quality of display screen of the display panel 1001.

In an alternative embodiment of the present application, a material of the hardened layer 21 is selected from one of an acrylic resin, a polyvinyl chloride resin and an aqueous polyurethane resin.

In another alternative embodiment of the present application, the material of the hardened layer 21 is a composite resin, and the composite resin comprises at least two different kinds of resins. By using composite resin as the material of the hardened layer 21, on the one hand, the anti-glare and anti-reflection film 20 can have a better extinction effect, on the other hand, the hardened layer 21 made of the composite resin has a better hardness. Specifically, the composite resin is a mixture of at least two of an acrylic resin, a polyvinyl chloride resin, and an aqueous polyurethane resin, etc.

In an alternative embodiment of the present application, the particle core 221 is selected from at least one of fumed $SiO_2$, precipitated $SiO_2$, modified $SiO_2$, and metal oxide particles.

In another alternative embodiment of the present application, the anti-glare and anti-reflection film 20 further comprises second extinction particles 23, and the second extinction particles 23 are dispersed in the hardened layer 21.

Specifically, the second extinction particles 23 may be exposed from the hardened layer 21, or may not be exposed from the hardened layer 21.

Wherein, the second extinction particles 23 are unmodified extinction particles, that is, the second extinction particles 23 do not comprise the first coating 222 and the second coating 223.

In an alternative embodiment of the present application, the second extinction particles 23 may be at least one of fumed $SiO_2$, precipitated $SiO_2$, modified $SiO_2$, and metal oxide particles, etc.

In an alternative embodiment of the present application, a mass percentage of the first extinction particles 22 is greater than 80% of a total mass of the first extinction particles 22 and the second extinction particles 23, so as to ensure the anti-glare and anti-reflection effect of the anti-glare and anti-reflection film 20.

In an alternative embodiment of the present application, a size of the second extinction particles 23 is smaller than a size of the first extinction particles 22.

The present application provides an anti-glare anti-reflection film, a polarizer and a display panel, wherein the polarizer comprises an anti-glare and anti-reflection film formed on the polarized body; wherein the anti-glare anti-reflection film comprises a hardened layer; and first extinction particles dispersed in the hardened layer; and wherein the first extinction particles comprise a particle core, a first coating covering the particle core, and a second coating covering the first coating, and the first coating has a refractive index different from that of the second coating. According to interference principle of reflected light, destructive interference may be occurred among lights incident on coatings with different refractive indexes of the first extinction particle, which can reduce reflectivity of the anti-glare and anti-reflection film, thereby improving anti-reflection effect of the anti-glare and anti-reflection film, and improving quality of display screen of the display panel. In addition, at least a part of the first extinction particles are exposed from a surface of the hardened layer away from the polarized body to change the surface of the hardened layer away from the polarized body into a roughened surface, so as to improve haze of the anti-glare and anti-reflection film, light may be scattered on the rough surface of the anti-glare and anti-reflection film, and light entering the anti-glare and anti-reflection film may be internally scattered and refracted, so that the anti-glare effect of the anti-glare and anti-reflection film may be improved, thereby improving quality of display screen of the display panel.

In summary, although the present application has been disclosed as the above preferred embodiments, the above preferred embodiments are not intended to limit the present application, and a person skilled in the art may make various changes and modifications without departing from the spirit and scope of the present application. Therefore, the protection scope of the present application is subject to the scope defined by the claims.

What is claimed is:

1. An anti-glare and anti-reflection film, comprising:
   a hardened layer;
   first extinction particles dispersed in the hardened layer; and
   second extinction particles dispersed in the hardened layer;
   wherein the first extinction particles comprise a particle core, a first coating covering the particle core, and a second coating covering the first coating, and the first coating has a refractive index different from that of the second coating; and
   wherein a mass percentage of the first extinction particles is greater than 80% of a total mass of the first extinction particles and the second extinction particles.

2. The anti-glare and anti-reflection film according to claim 1, wherein at least a part of the first extinction particles is exposed from a surface of the hardened layer to change the surface of the hardened layer into a roughened surface.

3. The anti-glare and anti-reflection film according to claim 2, wherein the first extinction particles exposed from the hardened layer are uniformly distributed and uniform in size.

4. The anti-glare and anti-reflection film according to claim 2, wherein a height of a portion of the first extinction particles exposed from the hardened layer protruding from a surface of the hardened layer is defined as H, and H is within a following range: $\frac{2}{3}R \leq H < 2R$, wherein R is a radius of the first extinction particles.

5. The anti-glare and anti-reflection film according to claim 2, wherein another part of the first extinction particles is accumulated in the hardened layer.

6. The anti-glare and anti-reflection film according to claim 1, wherein a diameter of the particle core is defined as d1, a thickness of the first coating is defined as d2, and a thickness of the second coating is defined as d3; wherein $2\ \mu m \leq d1 \leq 3\ \mu m$, $0.5\ \mu m \leq d2 \leq 1.5\ \mu m$, and $100\ nm \leq d3 \leq 200\ nm$.

7. The anti-glare and anti-reflection film according to claim 1, wherein a refractive index of the first coating is ranging from 1.3 to 1.4, and a refractive index of the second coating is ranging from 1.6 to 1.7.

8. The anti-glare and anti-reflection film according to claim 1, wherein a material of the hardened layer is a composite resin, and the composite resin comprises at least two different kinds of resins.

9. The anti-glare and anti-reflection film according to claim 1, wherein both the particle core and the second extinction particles are selected from at least one of fumed $SiO_2$, precipitated $SiO_2$, modified $SiO_2$, and metal oxide particles.

10. The anti-glare and anti-reflection film according to claim 1, wherein a size of the second extinction particles is smaller than a size of the first extinction particles.

11. A polarizer, comprising:
    a polarized body; and
    an anti-glare and anti-reflection film formed on the polarized body; wherein the anti-glare and anti-reflection film comprises:
    a hardened layer;
    first extinction particles dispersed in the hardened layer; and
    second extinction particles dispersed in the hardened layer;

wherein the first extinction particles comprise a particle core, a first coating covering the particle core, and a second coating covering the first coating, and the first coating has a refractive index different from that of the second coating; and wherein a mass percentage of the first extinction particles is greater than 80% of a total mass of the first extinction particles and the second extinction particles.

12. The polarizer according to claim 11, wherein at least a part of the first extinction particles are exposed from a surface of the hardened layer away from the polarized body.

13. The polarizer according to claim 12, wherein the first extinction particles exposed from the hardened layer are uniformly distributed and uniform in size.

14. The polarizer according to claim 12, wherein a height of a portion of the first extinction particles exposed from the hardened layer protruding from a surface of the hardened layer is defined as H, and H is within a following range: $\frac{2}{3}R \leq H < 2R$, wherein R is a radius of the first extinction particles.

15. The polarizer according to claim 12, wherein another part of the first extinction particles is accumulated in the hardened layer.

16. The polarizer according to claim 11, wherein a diameter of the particle core is defined as d1, a thickness of the first coating is defined as d2, and a thickness of the second coating is defined as d3; wherein 2 µm≤d1≤3 µm, 0.5 µm≤d2≤1.5 µm, and 100 nm≤d3≤200 nm.

17. The polarizer according to claim 11, wherein a material of the hardened layer is a composite resin, and the composite resin comprises at least two different kinds of resins.

18. A display panel comprising:
a display substrate; and
a polarizer; wherein the polarizer comprises a polarized body and an anti-glare and anti-reflection film formed on the polarized body; wherein the anti-glare and anti-reflection film comprises:
a hardened layer;
first extinction particles dispersed in the hardened layer; and
second extinction particles dispersed in the hardened layer;
wherein the first extinction particles comprise a particle core, a first coating covering the particle core, and a second coating covering the first coating, and the first coating has a refractive index different from that of the second coating; and
wherein a mass percentage of the first extinction particles is greater than 80% of a total mass of the first extinction particles and the second extinction particles.

* * * * *